(12) United States Patent
Aimono (10) Patent No.: US 8,786,926 B2
(45) Date of Patent: Jul. 22, 2014

(54) DRIVER FOR OPTICAL DEFLECTOR USING TWO ASYNCRONOUS SAW-TOOTH DRIVE VOLTAGES AND METHOD FOR SETTING THE SAME

(75) Inventor: Takanori Aimono, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 252 days.

(21) Appl. No.: 13/411,029

(22) Filed: Mar. 2, 2012

(65) Prior Publication Data

US 2012/0224239 A1    Sep. 6, 2012

(30) Foreign Application Priority Data

Mar. 4, 2011 (JP) ................................ 2011-048188

(51) Int. Cl.
*G02B 26/08* (2006.01)
(52) U.S. Cl.
USPC ..................................................... 359/199.4
(58) Field of Classification Search
CPC .................. G02B 26/0833; G02B 26/0858
USPC .......................................... 359/223.1–226.1
See application file for complete search history.

(56) References Cited

U.S. PATENT DOCUMENTS

| 7,407,105 B2 * | 8/2008 | Massieu ........................ 235/454 |
| 2007/0064300 A1 | 3/2007 | Barnes et al. |
| 2008/0239252 A1 | 10/2008 | Konno et al. |

FOREIGN PATENT DOCUMENTS

JP    2009-223165 A    10/2009

OTHER PUBLICATIONS

Extended European Search Report (EESR) dated Jun. 8, 2012 (in English) in counterpart European Application No. 12001391.7.

* cited by examiner

*Primary Examiner* — Euncha Cherry
(74) *Attorney, Agent, or Firm* — Holtz Holtz Goodman & Chick PC (57) ABSTRACT

An optical deflector includes a mirror, a movable frame for supporting the mirror, a support body surrounding the movable frame, and a first group of piezoelectric actuators and a second group of piezoelectric actuators alternating with the first group of piezoelectric actuators. A driver applies a first drive voltage having first saw-tooth waves to the first group of piezoelectric actuators, and applies a second drive voltage having second saw-tooth waves opposite in phase with the first saw-tooth waves to the second group of piezoelectric actuators. A difference in phase between the first and second saw-tooth waves is a predetermined value to suppress resonation of harmonic frequency components of the first and second drive voltages with a natural frequency of a mechanically-vibrating system of the mirror with respect to the axis thereof depending upon the piezoelectric actuators.

10 Claims, 11 Drawing Sheets

PRIOR ART

Fig. 11 ized based on a resonant frequency of a mechanically-vibrating system of the mirror with respect to the axis thereof depending upon the piezoelectric actuators and the ratio of the rising period to the falling period, to generate the first drive voltage. The first drive voltage is applied to the first group of piezoelectric actuators. Also, second drive data for the second group of piezoelectric actuators forming a saw-tooth wave opposite in phase to the saw-tooth wave formed by the first drive data is selected. Finally, the second drive data is optimized based on the resonant frequency of the mechanically-vibrating system of the mirror with respect to the axis thereof depending upon the piezoelectric actuators and the ratio of the rising period to the falling period, to generate the second drive voltage. The second drive voltage is applied to the second group of piezoelectric actuators.

US 8,786,926 B2

DRIVER FOR OPTICAL DEFLECTOR USING TWO ASYNCRONOUS SAW-TOOTH DRIVE VOLTAGES AND METHOD FOR SETTING THE SAME

This application claims the priority benefit under 35 U.S.C. §119 to Japanese Patent Application No. JP2011-048188 filed on Mar. 4, 2011, which disclosure is hereby incorporated in its entirety by reference.

BACKGROUND

1. Field

The presently disclosed subject matter relates to a driver for driving an optical deflector and a method for setting drive voltages therefor.

2. Description of the Related Art

A prior art two-dimensional optical deflector is constructed by a mirror; a movable frame surrounding the mirror for supporting the mirror through a pair of torsion bars; inner piezoelectric actuators fixed between the movable frame and the torsion bars and serving as cantilevers for rocking the mirror through the torsion bars with respect to an X-axis of the mirror; a support body surrounding the movable frame; and outer piezoelectric actuators fixed between the support body and the movable frame and serving as cantilevers for rocking the mirror through the movable frame with respect to a Y-axis of the mirror perpendicular to the X-axis (see: JP2009-223165A).

Generally, in an optical scanner, the mirror is rocked with respect to the X-axis for a horizontal deflection at a high frequency such as 15 kHz, while the mirror is rocked with respect to the Y-axis for a vertical deflection at a low frequency such as 60 Hz.

In the described prior art two-dimensional optical deflector, since the inner piezoelectric actuators rock the mirror through the torsion bars, the inner piezoelectric actuators are driven by synchronous sinusoidal-wave drive voltages.

On the other hand, since the outer piezoelectric actuators rock the mirror without torsion bars, the outer piezoelectric actuators are driven by synchronous saw-tooth drive voltages. In more detail, the outer piezoelectric actuators are folded at every actuator or jetting, and a first group of the outer piezoelectric actuators and a second group of the outer piezoelectric actuators alternating with the first group of the outer piezoelectric actuators are driven by two synchronous saw-tooth drive voltages, respectively.

However, when the first and second groups of the outer piezoelectric actuators are driven by such two synchronous saw-tooth drive voltages, the synchronous saw-tooth drive voltages include harmonic frequency components in addition to their fundamental frequency. Therefore, even when the fundamental frequency of the synchronous saw-tooth drive voltages is smaller than the natural frequencies of a mechanically-vibrating system of the mirror with respect to the Y-axis depending upon the structure of the outer piezoelectric actuators, one of the above-mentioned harmonic frequency components would coincide with one of the natural frequencies or be brought close to one of the natural frequencies. In this case, this harmonic frequency component of the drive voltages would resonate with such a natural frequency of the mechanically-vibrating system of the mirror with respect to the Y-axis, so that a higher frequency vibration would be superimposed onto the rocking of the mirror with respect to the Y-axis.

In order to avoid higher frequency vibration of the mirror, one approach is to make the natural frequencies much larger than the fundamental frequency of the synchronous saw-tooth drive voltages. In this case, however, since the mechanically-vibrating system of the mirror including the outer piezoelectric actuators is hardened, it would be difficult to rock the mirror at a larger deflection angle.

Another approach is to use synchronous sinusoidal-wave drive voltages whose frequency is much larger than the natural frequencies of the mechanically-vibrating system of the mirror with respect to the Y-axis, instead of the synchronous saw-tooth drive voltages. In this case, however, a linearly-deflected period within one period of the synchronous sinusoidal-wave drive voltages where the deflection angle is linearly changed becomes too small, i.e., an effective scanning period becomes too small, so it is not practical in an image display apparatus such as a projector to use such an optical deflector.

SUMMARY

The presently disclosed subject matter seeks to solve one or more of the above-described problems.

According to the presently disclosed subject matter, in an optical deflector comprising a mirror, a movable frame for supporting the mirror, a support body surrounding the movable frame, and a first group of piezoelectric actuators serving as cantilevers and a second group of piezoelectric actuators serving as cantilevers alternating with the first group of piezoelectric actuators, the piezoelectric actuators are folded at every actuator and connected from the support body to the movable frame. Each of the piezoelectric actuators is in parallel with one axis of the mirror. A driver generates a first drive voltage having first saw-tooth waves and applies the first drive voltage to the first group of piezoelectric actuators. The driver generates a second drive voltage having second saw-tooth waves opposite in phase to the first saw-tooth waves, and applies the second drive voltage to the second group of piezoelectric actuators. A difference in phase between the first and second saw-tooth waves is a predetermined value to suppress resonation of harmonic frequency components of the first and second drive voltages with a natural frequency of a mechanically-vibrating system of the mirror with respect to the axis thereof depending upon the piezoelectric actuators.

According to the presently disclosed subject matter, since use is made of synchronous saw-tooth waves, the deflection angle can be linearly changed for a longer period, so that the optical deflector according to the presently disclosed subject matter can be applied to an image display apparatus such as a projector. Also, the resonation of the harmonic frequency components of the first and second drive voltages with the natural frequency components of the mechanically-vibrating system of the mirror can be suppressed.

Also, in a method for setting drive data for driving an optical deflector including a mirror, a movable frame for supporting the mirror, a support body surrounding the movable frame, and a first group of piezoelectric actuators serving as cantilevers and a second group of piezoelectric actuators serving as cantilevers alternating with the first group of piezoelectric actuators, the piezoelectric actuators being folded at every actuator and connected from the support body to the movable frame, each of the piezoelectric actuators being in parallel with one axis of the mirror, a period is set common to first and second drive voltages for the first and second groups of piezoelectric actuators, respectively. Then, a ratio of a rising period to a falling period is designated. In this case, a total of the rising period and the falling period is equal to the period to select first drive data for the first group of piezoelectric actuators forming a saw-tooth wave having the rising period and the falling period. Finally, the first drive data is inverted and shifted to obtain second drive data for the second group of piezoelectric actuators. A shifted amount of the first drive data is a value corresponding to a half wave-length of a natural frequency of a mechanically-vibrating system of the mirror with respect to the axis thereof depending upon the piezoelectric actuators.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein.

DETAILED DESCRIPTION OF EXEMPLARY EMBODIMENTS

Figure 1:
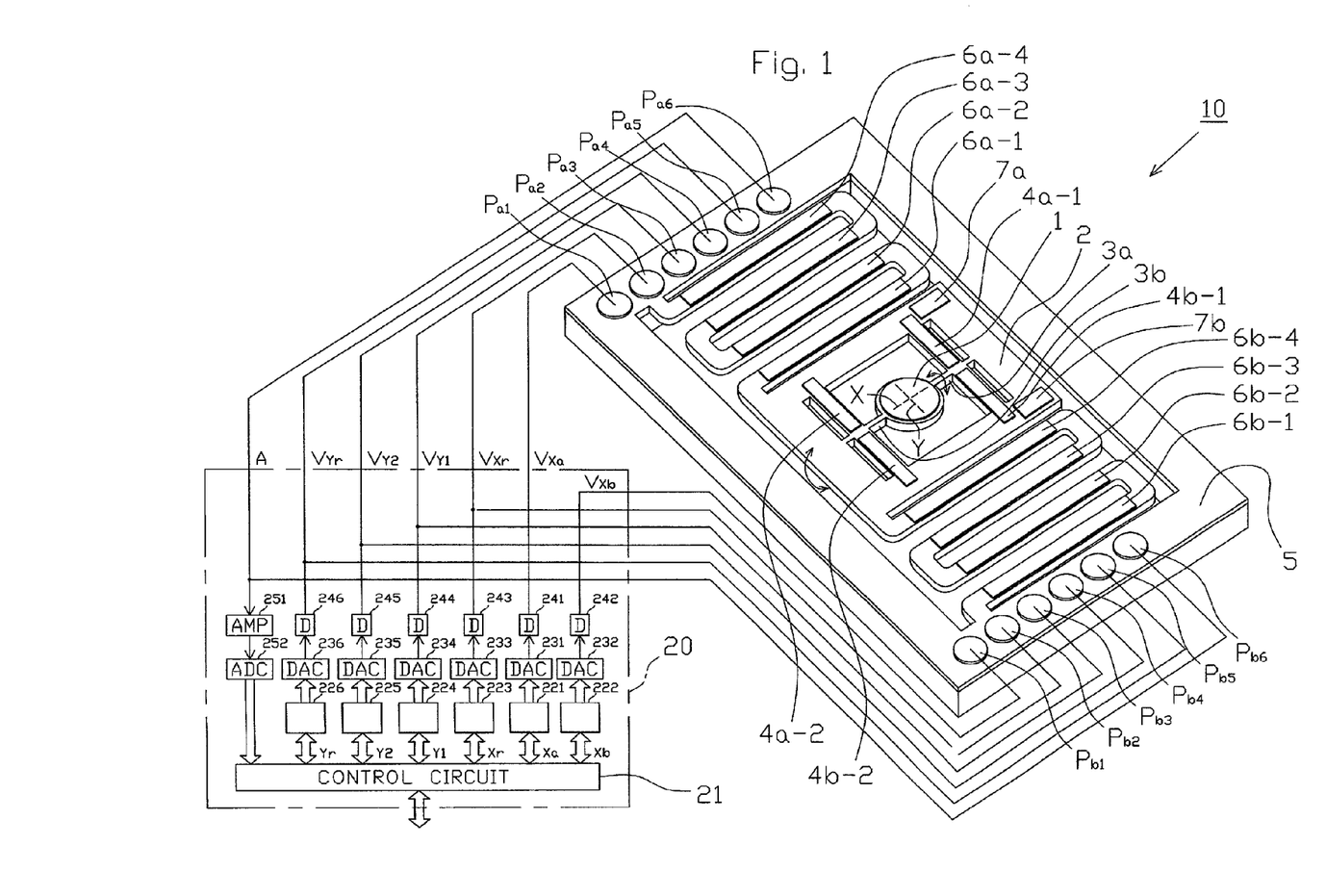
FIG. 1 is a view illustrating an embodiment of the driver for driving an optical deflector according to the presently disclosed subject matter.

In FIG. 1, which illustrates an embodiment of the driver for driving an optical deflector according to the presently disclosed subject matter, an optical deflector 10 and its driver 20 are provided.

The optical deflector 10 is constructed by a circular mirror 1 for reflecting an incident light, a movable frame 2 surrounding the mirror 1 for supporting the mirror 1 through a pair of torsion bars 3a and 3b, inner piezoelectric actuators 4a-1, 4a-2, 4b-1 and 4b-2 fixed between the movable frame 2 and the torsion bars 3a and 3b and serving as cantilevers for rocking the mirror 1 through the torsion bars 3a and 3b with respect to an X-axis of the mirror 1, a support body 5 surrounding the movable frame 2, outer piezoelectric actuators 6a-1, 6a-2, 6a-3 and 6a-4 and 6b-1, 6b-2, 6b-3 and 6b-4 fixed between the support body 5 and the movable frame 2 and serving as cantilevers for rocking the mirror 1 through the movable frame 2 with respect to a Y-axis of the mirror 1 perpendicular to the X-axis, and piezoelectric sensors 7a and 7b on the movable frame 2.

The torsion bars 3a and 3b are arranged along the X-axis, and have ends coupled to the inner circumference of the movable frame 2 and other ends coupled to the outer circumference of the mirror 1. Therefore, the torsion bars 3a and 3b are twisted by the inner piezoelectric actuators 4a-1, 4a-2, 4b-1 and 4b-2 to rock the mirror 1 with respect to the X-axis.

The inner piezoelectric actuators 4a-1 and 4b-1 oppose each other along the Y-axis and sandwich the torsion bar 3a. The inner piezoelectric actuators 4a-1 and 4b-1 have ends coupled to the inner circumference of the movable frame 2 and other ends coupled to the torsion bar 2a. In this case, the flexing direction of the inner piezoelectric actuator 4a-1 is opposite to that of the inner piezoelectric actuator 4b-1.

Similarly, the inner piezoelectric actuators 4a-2 and 4b-2 oppose each other along the Y-axis and sandwich the torsion bars 3b. The inner piezoelectric actuators 4a-2 and 4b-2 have ends coupled to the inner circumference of the movable frame 2 and other ends coupled to the torsion bar 2b.

In this case, the flexing direction of the inner piezoelectric actuator 4a-2 is opposite to that of the inner piezoelectric actuator 4b-2.

The support body 5 is rectangularly-framed to surround the movable frame 2.

The outer piezoelectric actuators 6a-1, 6a-2, 6a-3 and 6a-4, 6b-1, 6b-2, 6b-3 and 6b-4 are coupled between the inner circumference of the support body 5 and the outer circumference of the movable frame 2, in order to rock the movable frame 2 associated with the mirror 1 with respect to the support body 5, i.e., to rock the mirror 1 with respect to the Y-axis.

The outer piezoelectric actuators 6a-1, 6a-2, 6a-3 and 6a-4 are serially-coupled from the movable frame 2 to the support body 5. Also, each of the outer piezoelectric actuators 6a-1, 6a-2, 6a-3 and 6a-4 are in parallel with the X-axis of the mirror 1. Therefore, the outer piezoelectric actuators 6a-1, 6a-2, 6a-3 and 6a-4 are folded at every actuator or jetting from the support body 5 to the movable frame 2, so that the amplitudes of the outer piezoelectric actuators 6a-1, 6a-2, 6a-3 and 6a-4 can be changed along directions perpendicular to the Y-axis of the mirror 1.

Similarly, the outer piezoelectric actuators 6b-1, 6b-2, 6b-3 and 6b-4 are serially-coupled from the support body 5 to the movable frame 2. Also, each of the outer piezoelectric actuators 6b-1, 6b-2, 6b-3 and 6b-4 are in parallel with the X-axis of the mirror 1. Therefore, the outer piezoelectric actuators 6b-1, 6b-2, 6b-3 and 6b-4 are folded at every actuator or jetting from the support body 5 to the movable frame 2, so that the amplitudes of the outer piezoelectric actuators 6b-1, 6b-2, 6b-3 and 6b-4 can be changed along directions perpendicular to the Y-axis of the mirror 1.

The piezoelectric sensors 7a and 7b sense a deflection angle A of the mirror 1 with respect to the Y-axis.

Provided on the optical deflector 10 are pads $P_{a1}$, $P_{a2}$, $P_{a3}$, $P_{a4}$, $P_{a5}$ and $P_{a6}$ $P_{b1}$, $P_{b2}$, $P_{b3}$, $P_{b4}$, $P_{b5}$ and $P_{b6}$ which are connected to the driver 20.

Figure 2:
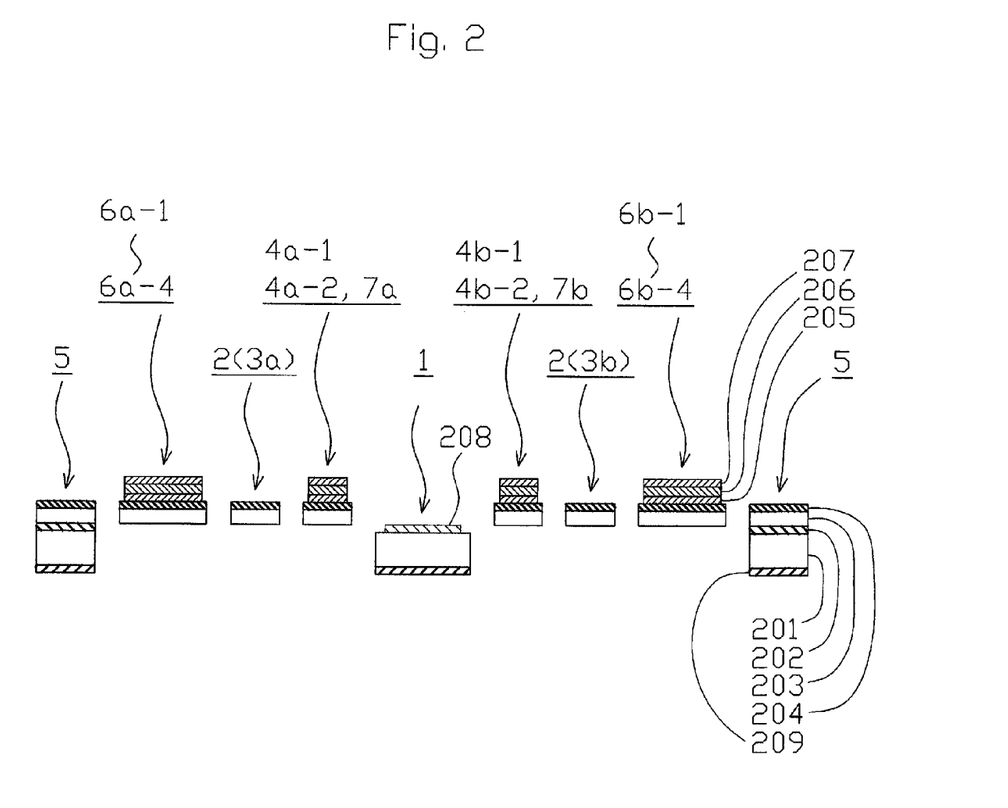
FIG. 2 is a cross-sectional view of the optical deflector of FIG. 1.

The pad $P_{a1}$ is connected to the upper electrode layer 207 (see: FIG. 2) of each of the inner piezoelectric actuators 4a-1 and 4a-2, and the pad $P_{ae}$ is connected to the lower electrode layer 205 (see: FIG. 2) of each of the inner piezoelectric actuators 4a-1 and 4a-2. Also, the pad $P_{a3}$ is connected to the upper electrode layer 207 (see: FIG. 2) of each of the outer piezoelectric actuators 6a-1 and 6a-3, and the pad $P_{a4}$ is connected to the upper electrode layer 207 (see: FIG. 2) of each of the outer piezoelectric actuators 6a-2 and 6a-4. Further, the pad $P_{a5}$ is connected to the lower electrode layer 205 (see: FIG. 2) of each of the outer piezoelectric actuators 6a-1, 6a-2, 6a-3 and 6a-4 and the lower electrode layer 205 (see:

FIG. 2) of the piezoelectric sensor 7a. Still further, the pad $P_{a6}$ is connected to the upper electrode layer 207 (see: FIG. 2) of the piezoelectric sensor 7a.

On the other hand, the pad $P_{b1}$ is connected to the upper electrode layer 207 (see: FIG. 2) of each of the inner piezoelectric actuators 4b-1 and 4b-2, and the pad $P_{b2}$ is connected to the lower electrode layer 205 (see: FIG. 2) of each of the inner piezoelectric actuators 4b-1 and 4b-2. Also, the pad $P_{b3}$ is connected to the upper electrode layer 207 (see: FIG. 2) of each of the outer piezoelectric actuators 6b-1 and 6b-3, and the pad $P_{b4}$ is connected to the upper electrode layer 207 (see: FIG. 2) of each of the outer piezoelectric actuators 6b-2 and 6b-4. Further, the pad $P_{b5}$ is connected to the lower electrode layer 205 (see: FIG. 2) of each of the outer piezoelectric actuators 6b-1, 6b-2, 6b-3 and 6b-4 and the lower electrode layer 205 (see: FIG. 2) of the piezoelectric sensor 7b. Still further, the pad $P_{b6}$ is connected to the upper electrode layer 207 of the piezoelectric sensor 7b.

The driver 20 is constructed by a control circuit 21 such as a microcomputer including a central processing unit (CPU), a read-only memory (ROM), a random access memory (RAM), an input/output (I/O) interface and the like.

The driver 20 further includes a nonvolatile memory 221 for storing drive data Xa for driving the upper electrode layers of the inner piezoelectric actuators 4a-1 and 4a-2, a digital-to-analog converter (DAC) 231 for converting the drive data Xa into a drive voltage $V_x$, and a drive circuit 241 for applying the drive voltage $V_{Xa}$ to the pad $P_{a1}$.

The driver 20 further includes a nonvolatile memory 222 for storing drive data Xb for driving the upper electrode layers of the inner piezoelectric actuators 4b-1 and 4b-2, a digital-to-analog converter (DAC) 232 for converting the drive data Xb into a drive voltage $V_{Xb}$, and a drive circuit 242 for applying the drive voltage $V_{Xb}$ to the pad $P_{b1}$.

The driver 20 further includes a nonvolatile memory 223 for storing reference data Xr for driving the lower electrode layers of the inner piezoelectric actuators 4a-1, 4a-2, 4b-1 and 4b-2, a digital-to-analog converter (DAC) 233 for converting the reference data Xr into a reference voltage $V_{Xr}$, and a drive circuit 243 for applying the reference voltage $V_{Xr}$ to the pads $P_{a2}$ and $P_{b2}$.

The driver 20 further includes a nonvolatile memory 224 for storing drive data Y1 for driving the upper electrode layers of the outer piezoelectric actuators 6a-1, 6a-3, 6b-1 and 6b-3, a digital-to-analog converter (DAC) 234 for converting the drive data Y1 into a drive voltage $V_{Y1}$, and a drive circuit 244 for applying the drive voltage $V_{Y1}$ to the pads $P_{a3}$ and $P_{b3}$.

The driver 20 further includes a nonvolatile memory 225 for storing drive data Y2 for driving the upper electrode layers of the outer piezoelectric actuators 6a-2, 6a-4, 6b-2 and 6b-4, a digital-to-analog converter (DAC) 235 for converting the drive data Y2 into a drive voltage $V_{Y2}$, and a drive circuit 245 for applying the drive voltage $V_{Y2}$ to the pads $P_{a4}$ and $P_{b4}$.

The driver 20 further includes a nonvolatile memory 226 for storing reference data Yr for driving the lower electrode layers of the outer piezoelectric actuators 6a-1, 6a-2, 6a-3, 6a-4, 6b-1, 6b-2, 6b-3 and 6b-4, a digital-to-analog converter (DAC) 236 for converting the reference data Yr into a reference voltage $V_{Yr}$, and a drive circuit 246 for applying the reference voltage $V_{Yr}$ to the pads $P_{a5}$ and $P_{b5}$.

The driver 20 further includes an amplifier 251 for amplifying an analog deflection angle A of the mirror 1 from the pads $P_{a6}$ and $P_{b6}$ and an analog-to-digital converter (ADC) 252 for converting the analog deflection angle A into a digital deflection angle data.

Note that the number of the outer piezoelectric actuators 6a-1, 6a-2, 6a-3 and 6a-4 and the number of the outer piezoelectric actuators 6b-1, 6b-2, 6b-3 and 6b-4 can be other values such as 2, 6, 8, . . . .

The structure of each element of the optical deflector 10 is explained next with reference to FIG. 2.

In FIG. 2, a monocrystalline silicon support layer 201, an intermediate silicon oxide layer 202 and a monocrystalline silicon active layer 203 are formed by a silicon-on-insulator (SOI) substrate. Also, reference numeral 204 designates a silicon oxide layer, 205 designates a lower electrode layer made of Pt, Au or the like, 206 designates a lead titanate zirconate (PZT) layer, 207 designates an upper electrode layer made of Pt, Au or the like, 208 designates a metal layer made of Al, Ag or the like, and 209 designates a hard mask layer made of silicon oxide or the like.

The mirror 1 is constructed by the monocrystalline silicon support layer 201 serving as a vibration plate, the metal layer 208 serving as a reflector and the hard mask layer 209.

Each of the movable frame 2 as well as the torsion bars 3a and 3b is constructed by the monocrystalline silicon active layer 203 and the silicon oxide layer 204.

The inner piezoelectric actuators 4a-1, 4a-2, 4b-1 and 4b-2 and the outer piezoelectric actuators 6a-1 to 6a-4 and 6b-1 to 6b-4 and the piezoelectric sensors 7a and 7b are constructed by the monocrystalline silicon active layer 203, the silicon oxide layer 204, the lower electrode layer 205, the PZT layer 206 and the upper electrode layer 207.

The support body 5 is constructed by the monocrystalline silicon support layer 201, the intermediate silicon oxide layer 202, the monocrystalline silicon active layer 203, the silicon oxide layer 204 and the hard mask layer 209.

The pads $P_{a1}$, $P_{a2}$, $P_{a3}$, $P_{a4}$, $P_{a5}$ and $P_{a6}$, $P_{b1}$, $P_{b2}$, $P_{b3}$, $P_{b4}$, $P_{b5}$ and $P_{b6}$ are constructed by the lower electrode layer 205.

First, an optical deflection or horizontal scanning operation by rocking the mirror 1 with respect to the X-axis is explained below.

That is, the drive voltage $V_{Xa}$ based upon the drive data Xa stored in advance in the nonvolatile memory 221 and the drive voltage $V_{Xb}$ based upon the drive data Xb stored in advance in the nonvolatile memory 222 are sinusoidal at a predetermined frequency such as 15 kHz and symmetrical or opposite in phase to each other with the reference voltage $V_{Xr}$ based upon the reference data Xr stored in advance in the nonvolatile memory 223. As a result, the inner piezoelectric actuators 4a-1 and 4a-2 and the inner piezoelectric actuators 4b-1 and 4b-2 carry out flexing operations in opposite directions to each other, so that the torsion bars 3a and 3b are twisted to rock the mirror 1 with respect to the X-axis.

In the optical deflection or horizontal scanning operation by rocking the mirror 1 with respect to the X-axis, the rising and falling timings of the drive voltage $V_{Xa}$ coincide with the falling and rising timings, respectively, of the drive voltage $V_{Xb}$, so the drive voltages $V_{Xa}$ and $V_{Xb}$ can be said to be synchronous with each other.

Next, an optical deflection or vertical scanning operation by rocking the mirror 1 with respect to the Y-axis is explained below.

The outer piezoelectric actuators 6a-1, 6a-2, 6a-3, 6a-4, 6b-1, 6b-2, 6b-3 and 6b-4 are divided into an odd-numbered group of the outer piezoelectric actuators 6a-1 and 6a-3; 6b-1 and 6b-3, and an even-numbered group of the outer piezoelectric actuators 6a-2 and 6a-4; 6b-2 and 6b-4 alternating with the odd-numbered group of the outer piezoelectric actuators 6a-1 and 6a-3; 6b-1 and 6b-3.

Figure 3:
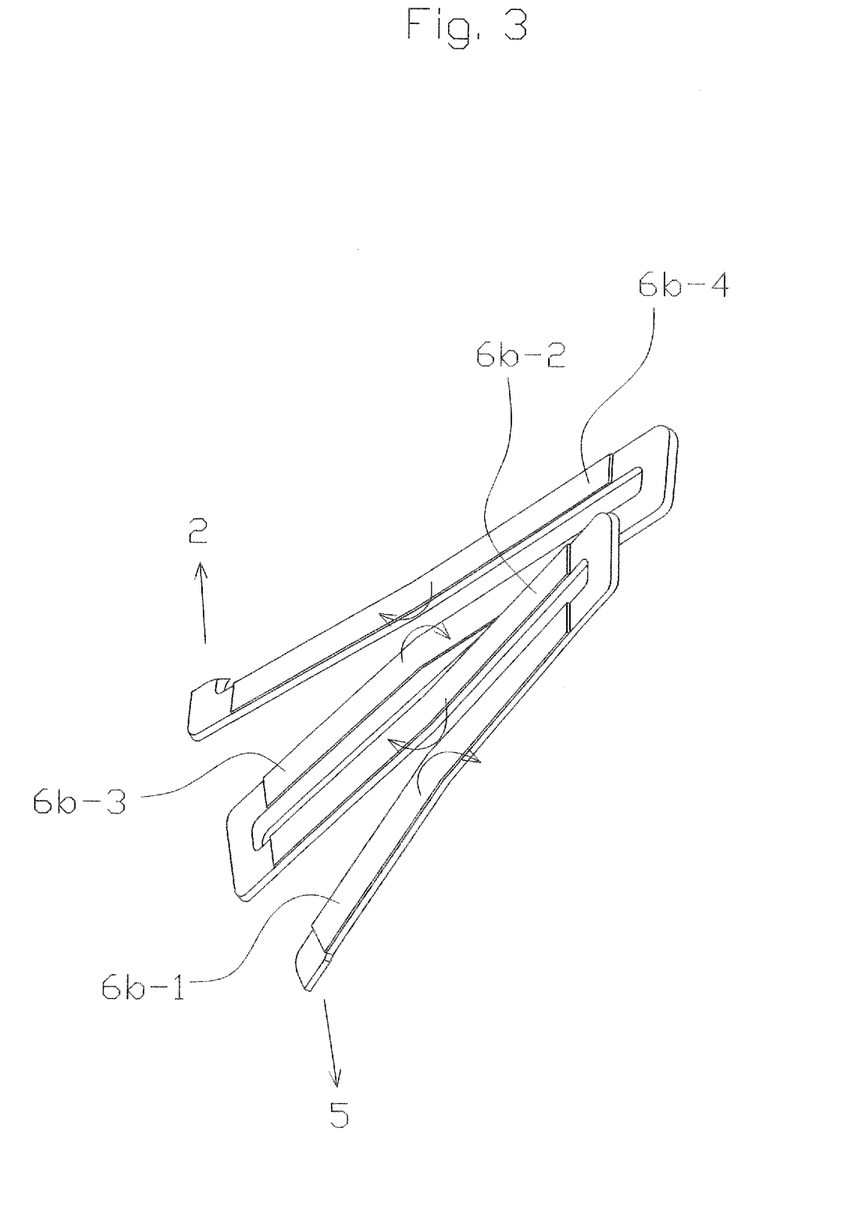
FIG. 3 is a diagram for explaining the operation of the outer piezoelectric actuators of FIG. 1.

As illustrated in FIG. 3 which illustrates only the outer piezoelectric actuators 6b-1, 6b-2, 6b-3 and 6b-4, when the odd-numbered group of the outer piezoelectric actuators 6a-1, 6a-3, 6b-1 and 6b-3 are flexed in one direction, for example, in a downward direction, the even-numbered group of the outer piezoelectric actuators 6a-2, 6a-4, 6b-2 and 6b-4 are flexed in the other direction, i.e., in an upward direction. On the other hand, when the odd-numbered group of the outer piezoelectric actuators 6a-1, 6a-3, 6b-1 and 6b-3 are flexed in the upward direction, the even-numbered group of the outer piezoelectric actuators 6a-2, 6a-4, 6b-2 and 6b-4 are flexed in the downward direction. Thus, the mirror 1 is rocked.

Figure 4A:
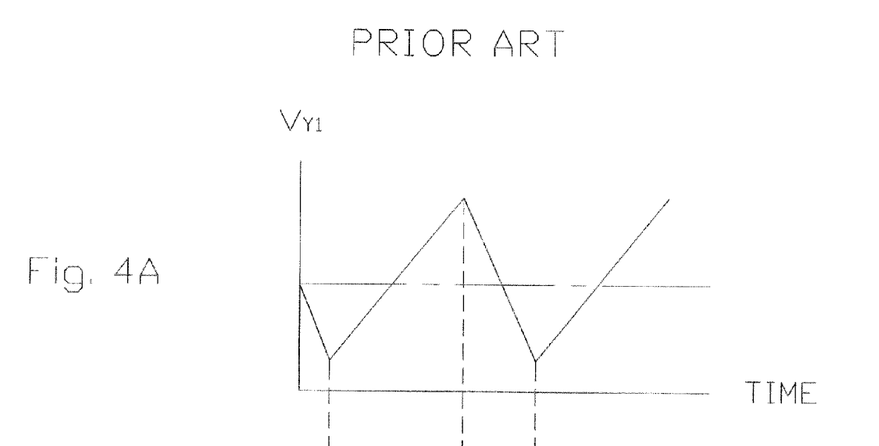
FIGS. 4A, 4B and 4C are timing diagrams for illustrating the drive voltages $V_{Y1}$, $V_{Y2}$ and the deflection angle A of FIG. 1 when the driver of FIG. 1 is applied to the prior art.
Figure 4B:
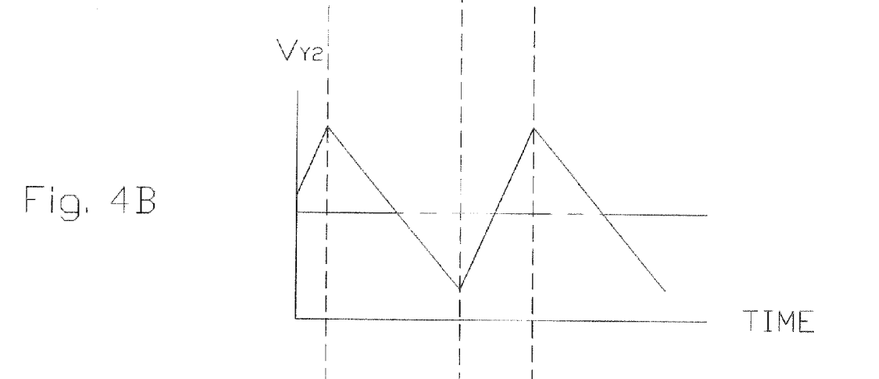
Figure 5:
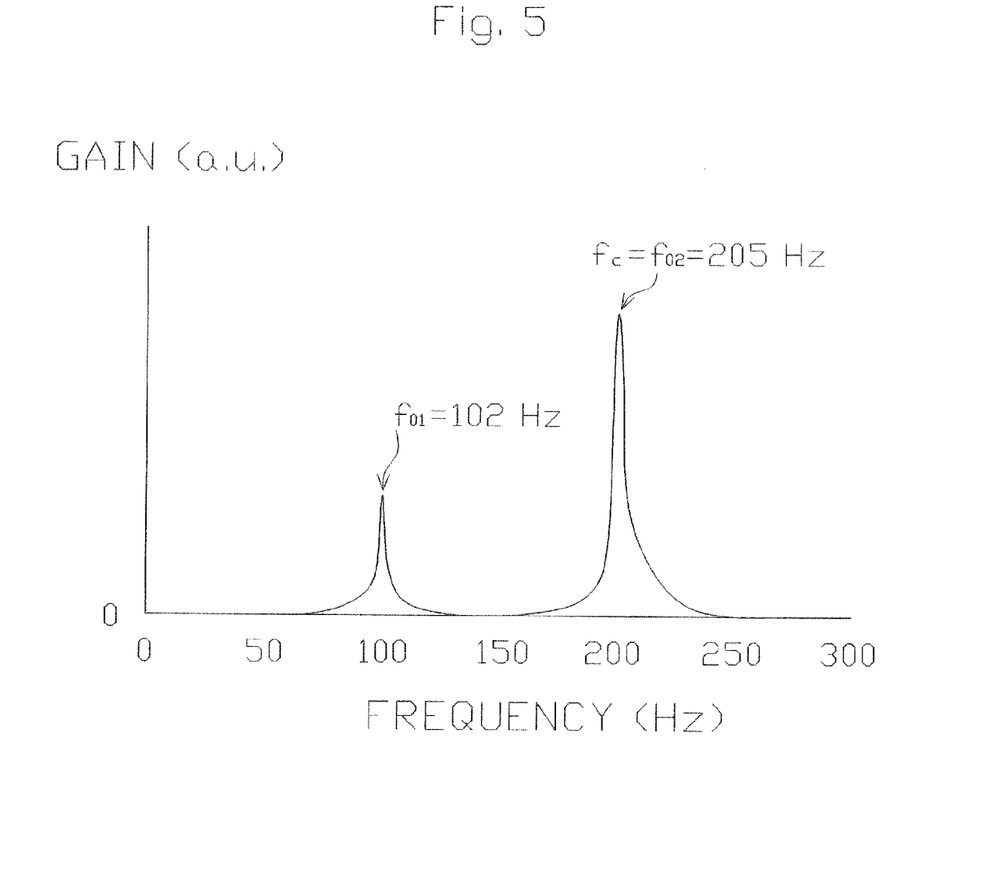
FIG. 5 is an experimentally-obtained frequency spectrum diagram of the mechanically-vibrating system of the mirror of FIG. 1.

For example, assume that the drive voltage $V_{y1}$ is saw-tooth-shaped as illustrated in FIG. 4A and the drive voltage $V_{y2}$ is saw-tooth-shaped as illustrated in FIG. 4B. That is, the drive voltages $V_{y1}$ and $V_{y2}$ are synchronous. In this case, if the outer piezoelectric actuators 6a-1, 6a-2, 6a-3 and 6a-4, 6b-1, 6b-2, 6b-3 and 6b-4 were 30 μm thick, 35 mm long and 0.2 mm wide and their spring constant was $5 \times 10^{-3}$ N/cm$^3$, the frequency characteristics were experimentally obtained as illustrated in FIG. 5.

Figure 6:
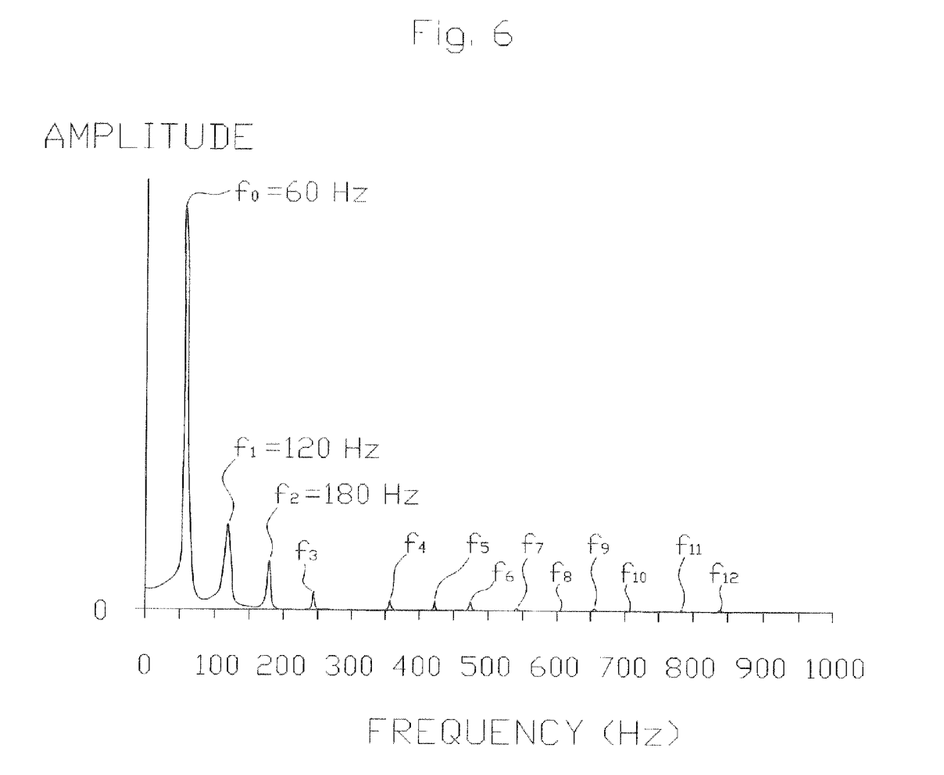
FIG. 6 is a frequency characteristic diagram of the drive voltages $V_{Y1}$ and $V_{Y2}$ of FIG. 1.

On the other hand, the frequency characteristics of the drive voltages $V_{y1}$ and $V_{y2}$ whose frequency is 60 Hz are illustrated in FIG. 6.

Figure 4C:
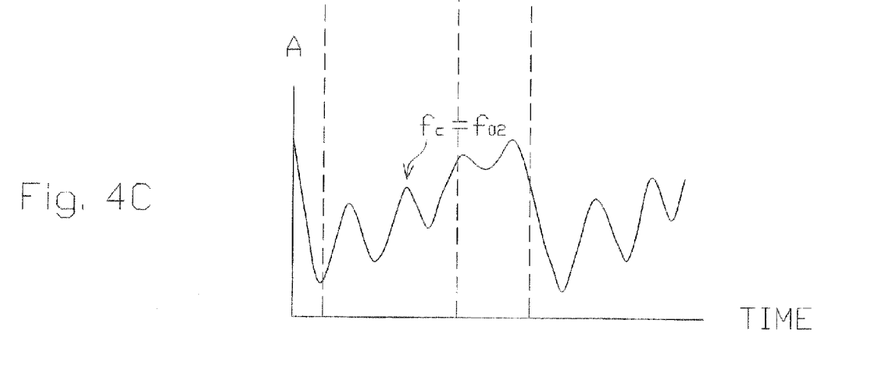

Therefore, if a harmonic frequency component such as a first-order harmonic frequency component $f_1$ (=120 Hz) of the drive voltages $V_{y1}$ and $V_{y2}$ is close to a natural frequency $f_c = f_{o2} = 205$ Hz of a mechanically-vibrating system of the mirror 1 with respect to the Y-axis depending upon the outer piezoelectric actuators 6a-1, 6a-2, 6a-3, 6a-4, 6b-1, 6b-2, 6b-3 and 6b-4, the first-order frequency component $f_1$ would resonate with the natural frequency $f_c = f_{o2}$, so that the natural frequency $f_c$ would appear in the deflection angle A of the mirror 1 as illustrated in FIG. 4C.

According to the presently disclosed subject matter, asynchronous saw-tooth drive voltages $V_{y1}$ and $V_{y2}$ are used instead of the synchronous saw-tooth drive voltages $V_{y1}$ and $V_{y2}$ of FIGS. 4A and 4B, so that the high harmonic components caused by the resonance of the drive voltages $V_{y1}$ and $V_{y2}$ with the natural frequency can be compensated for. Also, the amplitudes of the drive voltages $V_{y1}$ and $V_{y2}$ are adjusted, so that the above-mentioned high harmonic components can be more completely compensated for.

Figure 7:
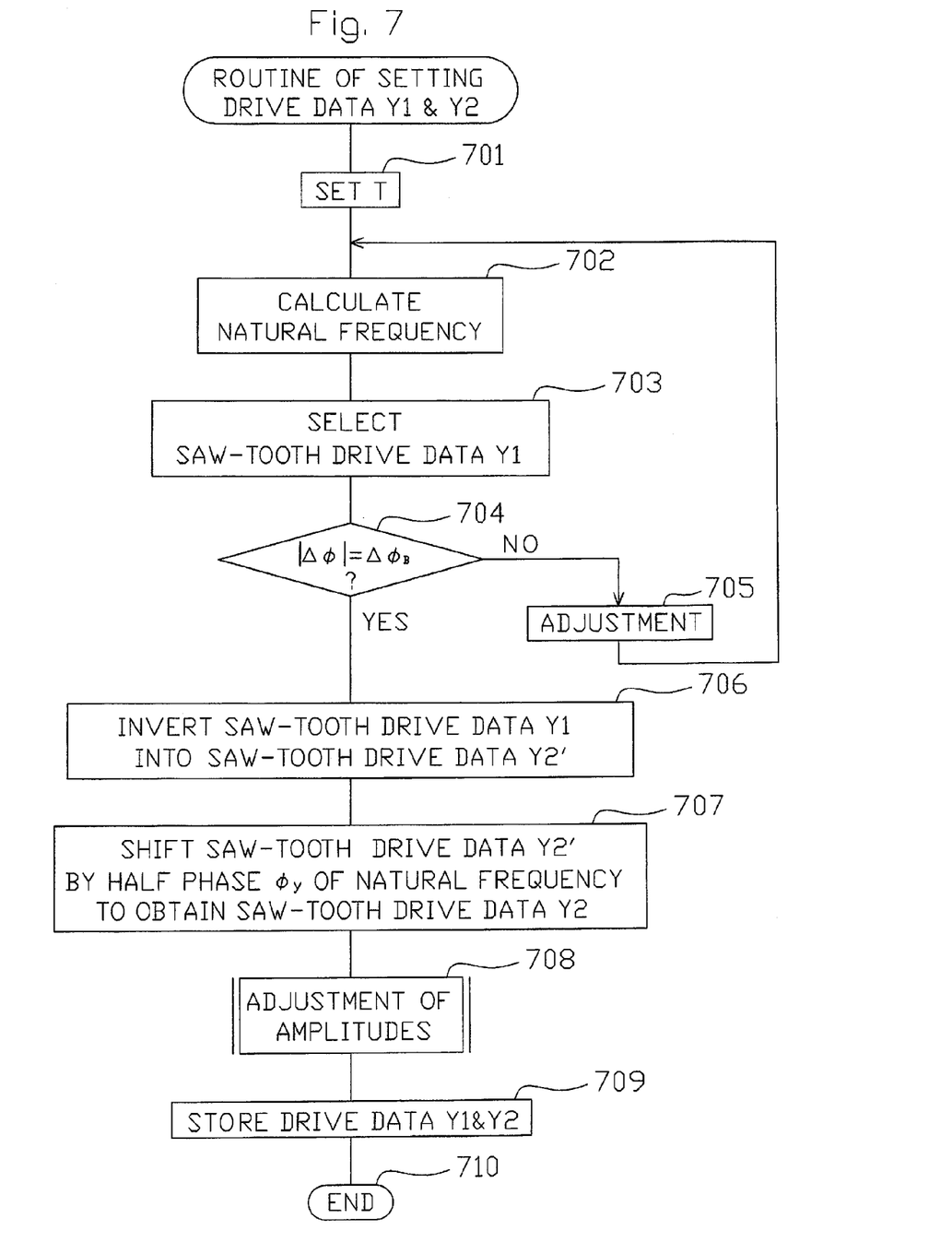
FIG. 7 is a flowchart for explaining an example of setting the drive data of the outer piezoelectric actuators as an operation of the control circuit of FIG. 1.

FIG. 7 is a flowchart for explaining an example of setting the drive data $V_{y1}$ and $V_{y2}$ of the outer piezoelectric actuators as an operation of the control circuit 21 of FIG. 1.

First, referring to step 701, a period T of the drive voltages $V_{y1}$ and $V_{y2}$ is set in accordance with the customer's request and so on. For example, if the vertical deflection is carried out at a frequency of 60 Hz, $$T \leftarrow 1/60$$

where T is a period.

Next, referring to step 702, the CPU of the control circuit 21 calculates a natural frequency $f_c$ of the mechanically-vibrating system of the mirror 1 with respect to the Y-axis depending upon the structure of the outer piezoelectric actuators 6a-1, 6a-2, 6a-3 and 6a-4, 6b-1, 6b-2, 6b-3 and 6b-4. In this case, since the outer piezoelectric actuators 6a-1, 6a-2, 6a-3 and 6a-4; 6b-1, 6b-2, 6b-3 and 6b-4 can be considered to be a distribution constant system of serially-connected cantilevers, so that the maximum value of an elastic energy can be equivalent to the maximum value of a kinetic energy due to Rayleigh's law, the high frequency component $f_c$ of the mirror 1 due to the resonance phenomenon is approximated to $$f_c = (1/2\pi) \cdot \sqrt{(35 \times E \times t^2 / 33 \times \rho \times (L \times n)^4)}$$

where E is a modulus of direct elasticity of the piezoelectric actuators 6a-1, 6a-2, 6a-3 and 6a-4, 6b-1, 6b-2, 6b-3 and 6b-4;

t is a thickness of the piezoelectric actuators 6a-1, 6a-2, 6a-3 and 6a-4, 6b-1, 6b-2, 6b-3 and 6b-4;

$\rho$ is a density of the piezoelectric actuators 6a-1, 6a-2, 6a-3 and 6a-4, 6b-1, 6b-2, 6b-3 and 6b-4;

L is a length of the piezoelectric actuators 6a-1, 6a-2, 6a-3 and 6a-4, 6b-1, 6b-2, 6b-3 and 6b-4; and n is the number of the piezoelectric actuators 6a-1, 6a-2, 6a-3 and 6a-4, 6b-1, 6b-2, 6b-3 and 6b-4.

Even in this case, for example, when the outer piezoelectric actuators 6a-1, 6a-2, 6a-3 and 6a-4, 6b-1, 6b-2, 6b-3 and 6b-4 are 30 μm thick, 35 mm long and 0.2 mm wide and their spring constant is $5.0 \times 10^{-3}$ N/cm$^2$, the frequency characteristics of the mirror 1 are experimentally obtained as illustrated in FIG. 5 where $f_{o1} = 102$ Hz and $f_c = f_{o2} = 205$ Hz are natural frequencies.

Next, referring to step 703, a saw-tooth drive data Y1 for the saw-tooth drive voltage $V_{y1}$ is selected by designating a ratio of T1a to T1b. In this case, $$T1a + T1b = T$$

$$T1a > T1b$$

For example, $$T1a : T1b = 9:1$$

Figure 8A:
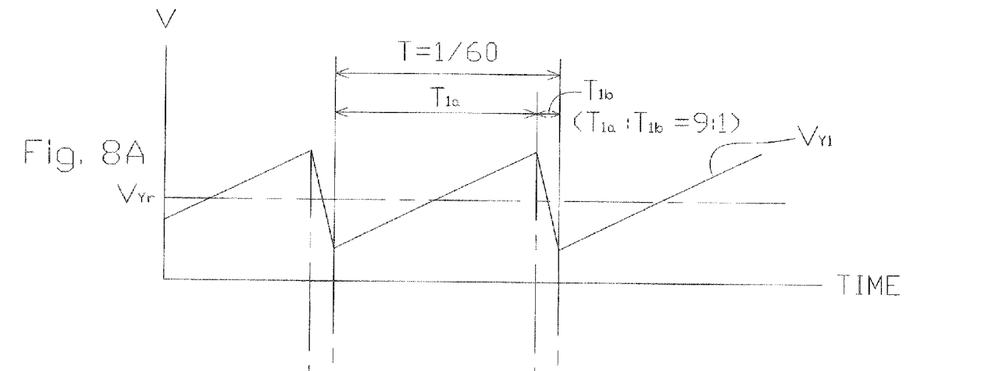
FIGS. 8A, 8B and 8C are timing diagrams of the drive voltage $V_{Y1}$ the drive voltage $V_{Y2}'$ and the drive voltage $V_{Y2}$ at steps 702, 706 and 707 of FIG. 7.

As a result, the saw-tooth drive voltage $V_{y1}$ for the saw-tooth drive data Y1 as illustrated in FIG. 8A is selected.

Figure 8B:
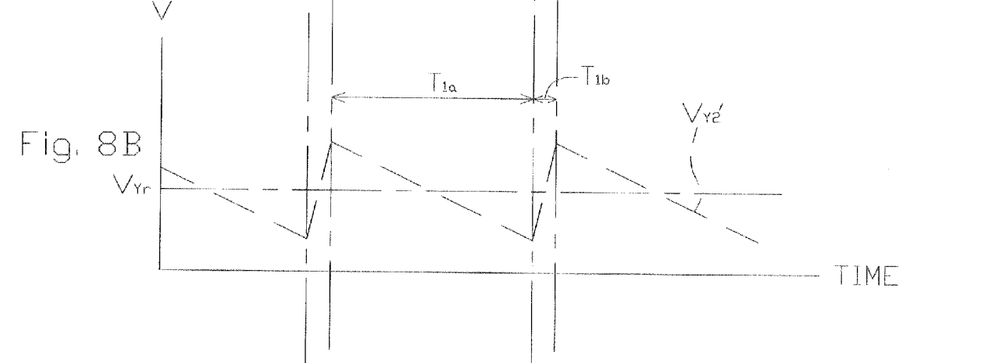
Figure 8C:
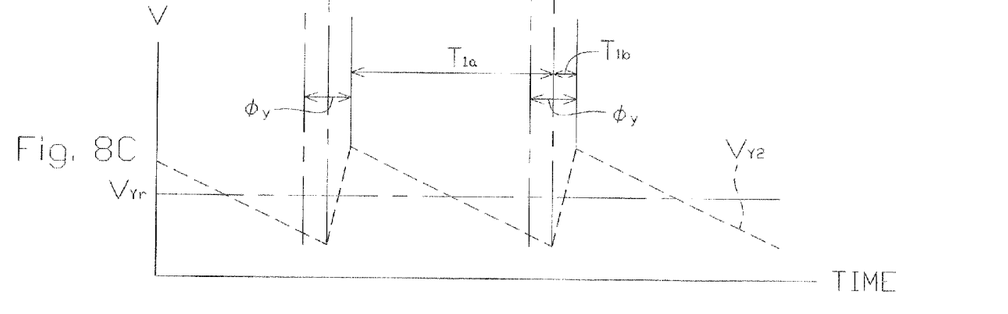
Figure 9:
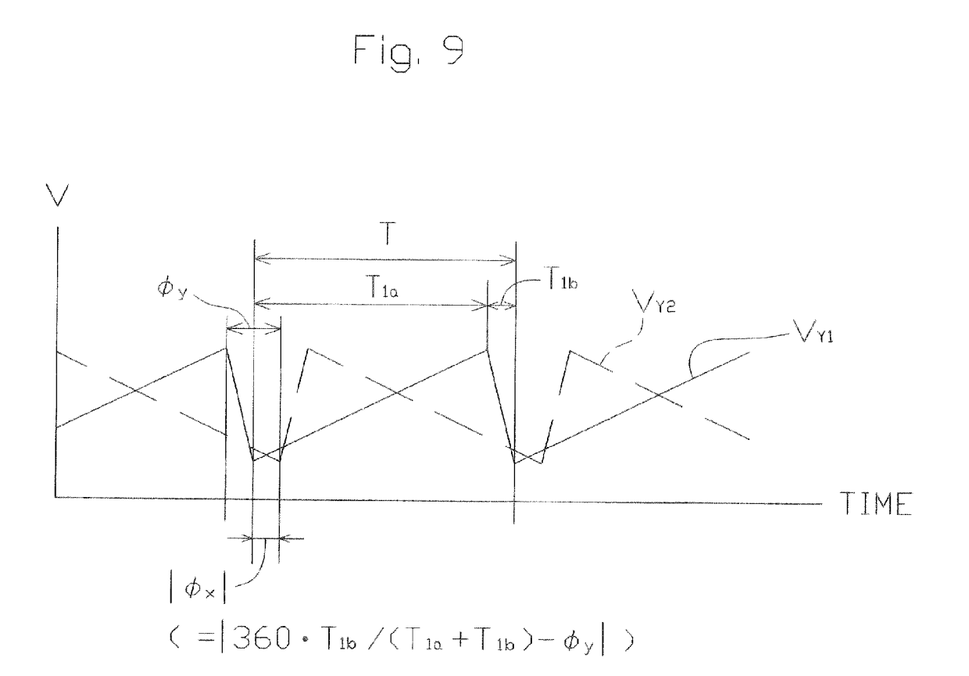
FIG. 9 is a timing diagram for explaining |Δϕ| at step 704 of FIG. 7.

Next, referring to step 704, it is determined whether a phase difference $|\Delta\phi|$ as illustrated in FIG. 9 is around a predetermined value $\Delta\phi_B$. In FIG. 9, a drive voltage $V_{y2}$ will be obtained at step 707 (see: FIG. 8C). The phase difference $\Delta\phi$ is defined by $$|\Delta\phi| = |360 \cdot T1b/(T1a+T1b) - \phi_y| (\deg)$$

For example, if T1a:T1b=9:1 and the resonance frequency $f_c = 205$ Hz, $$|\Delta\phi| = |360/10 - \phi_y| \ (deg)$$

$$\phi_y = 60 \times (1/(2 \cdot f_c)) \times 360 \ (deg)$$

$$= 52.7 \ (deg)$$

$$\Delta\phi_B = 17 \ (deg)$$

That is, if $|\Delta\phi|=0$, a start timing of a rising period of the drive voltage $V_{y1}$ coincides with a start timing of a rising period of the drive voltage $V_{y2}$, thereby to generate large ringing phenomenon. On the other hand, if $|\Delta\phi|$ is too large, a linear scanning period becomes short. Therefore, $|\Delta\phi|$ should be around the predetermined value $|\Delta\phi_B|$. As a result, if $|\Delta\phi|$ is around the value $\Delta\phi_B$, the control proceeds to step 706. Otherwise, the control proceeds to step 705 which adjusts the ratio T1a:T1b and/or redesigns the outer piezoelectric actuators 6a-1, 6a-2, 6a-3 and 6a-4, 6b-1, 6b-2, 6b-3 and 6b-4 to return to steps 702 and 703 which change the natural frequency $f_c$ and/or the saw-tooth drive data Y1.

Next, referring to step 706, the drive data Y1 is inverted with respect to the reference data Yr into drive data Y2'. That is, the drive voltage $V_{y1}$ as illustrated in FIG. 8A is inverted with respect to the reference voltage $V_{Yr}$ into a T1b:T1a saw-tooth drive voltage $V_{y2}'$, as illustrated in FIG. 8B.

Next, referring to step 707, the drive data Y2' is shifted by a half phase $\phi_y$ of the resonance frequency $f_c$ to obtain drive data Y2 for a drive voltage $V_{y2}$ as illustrated in FIG. 8C.

Next, referring to step 708, the amplitudes of the drive voltages $V_{y1}$ and $V_{y2}$, i.e., the drive data Y1 and Y2 are adjusted for a reason that will be discussed later.

Next, referring to step 709, drive data Y1 for the drive voltage $V_{y1}$ and drive data Y2 for the drive voltage $V_{y2}$ are stored in the nonvolatile memories 224 and 225, respectively.

Then, the routine of FIG. 7 is completed by step 710.

Figure 10A:
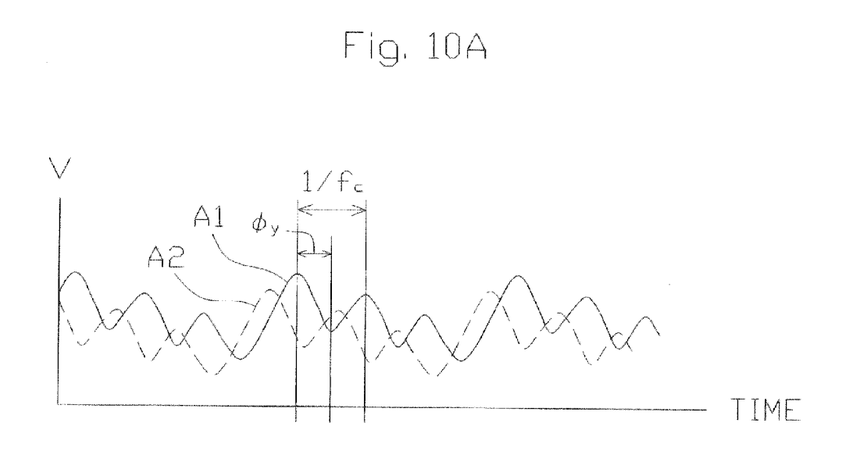
FIGS. 10A and 10B are timing diagrams for explaining the deflection angle A in the flowchart of FIG. 7.

By steps 703, 706 and 707, the two asynchronous drive data Y1 and Y2 for the asynchronous drive voltages $V_{y1}$ and $V_{y2}$ with the phase difference $\phi_y$ are obtained. In this case, if only the piezoelectric actuators 6a-1, 6a-3; 6b-1, 6b-3 are driven by the drive voltage $V_{y1}$ as illustrated in FIG. 8A, a deflection angle A1 of the mirror 1 indicated by a solid line in FIG. 10A would be obtained. Similarly, if only the piezoelectric actuators 6a-2, 6a-4; 6b-2, 6b-4 are driven by the drive voltage $V_{y2}$ as illustrated in FIG. 8C, a deflection angle A2 of the mirror 1 indicated by a dotted line in FIG. 10A would be obtained. In this case, since the deflection angles A1 and A2 have high frequency components $f_c$ in opposite phase $\phi_y$ to each other, when the piezoelectric actuators 6a-1, 6a-3; 6b-1, 6b-3 are driven by the drive voltage $V_{y1}$ as illustrated in FIG. 8A, and simultaneously, the piezoelectric actuators 6a-2, 6a-4; 6b-2, 6b-4 are driven by the drive voltage $V_{y2}$ as illustrated in FIG. 8C, the high frequency component $f_c$ included in the deflection angle A1 and the high frequency component $f_c$ included in the deflection angle A2 are compensated for by each other. However, generally, the amplitude of the high frequency component $f_c$ included in the deflection angle A1 is different from the amplitude of the high frequency component $f_c$ included in the deflection angle A2 due to the length of connections and the loads of the outer piezoelectric actuators 6a-1, 6a-2, 6a-3 and 6a-4; 6b-1, 6b-2, 6b-3 and 6b-4 and so on. Therefore, in order to more completely compensate for the high frequency component $f_c$ included in both of the deflection angles A1 and A2 of FIG. 10A, at step 708, the amplitude of the drive voltage $V_{y1}$ and/or the amplitude of the drive voltage $V_{y2}$, i.e., the drive data Y1 and/or Y2 are adjusted, in such a way that the amplitude of the deflection angle A1 when only the drive voltage $V_{y1}$ is applied without applying the drive voltage $V_{y2}$ is equal to the amplitude of the deflection angle A2 when only the drive voltage $V_{y2}$ is applied without applying the drive voltage $V_{y1}$.

Figure 11:
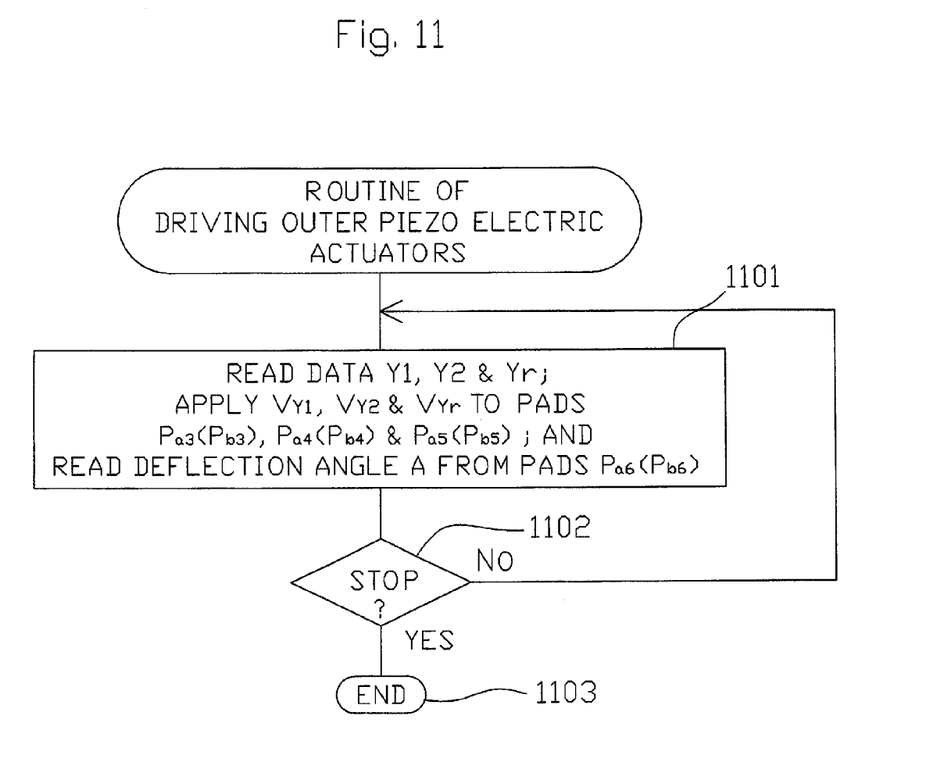
FIG. 11 is a flowchart for explaining the driving of the outer piezoelectric actuators as an operation of the control circuit of FIG. 1.

FIG. 11 is a flowchart for explaining driving of the outer piezoelectric actuators as an operation of the control circuit 21 of FIG. 1 in accordance with the drive data Y1, Y2 and Yr stored in the nonvolatile memories 224, 225 and 226 by the routine of FIG. 7.

Figure 10B:
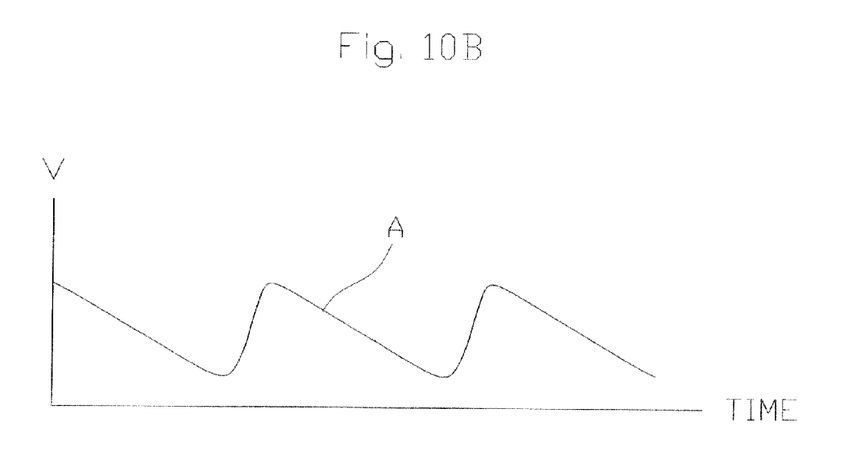

Referring to step 1101, the drive data Y1 and Y2 are sequentially readout of the nonvolatile memories 224 and 225, so that the drive voltage $V_{y1}$ as illustrated in FIG. 8A is applied to the odd-numbered group of the outer piezoelectric actuators 6a-1, 6a-3, 6b-1 and 6b-3, and the drive voltage $V_{y2}$ as illustrated in FIG. 8C is applied to the even-numbered group of the outer piezoelectric actuators 6a-2, 6a-4, 6b-2 and 6b-4. Simultaneously, a deflection angle A of the mirror 1 as illustrated in FIG. 10B is read from the pads $P_{a6}$ and $P_{b6}$. As illustrated in FIG. 10B, the deflection angle A includes no resonance frequency component $f_c$.

Then, step 1101 of FIG. 11 is repeated by step 1102 1002 until a stop message is input or generated.

At step 1101, note that the drive voltage $V_{y1}$ as illustrated in FIG. 8A can be applied to the even-numbered group of the outer piezoelectric actuators 6a-2, 6a-4, 6b-2 and 6b-4, and the drive voltage $V_{y2}$ as illustrated in FIG. 8C can be applied to the odd-numbered group of the outer piezoelectric actuators 6a-1, 6a-3, 6b-1 and 6b-3.

According to the above-described embodiment, since the rising period (or falling period) of the drive voltage $V_{y1}$ and the falling period (or rising period) of the drive voltage $V_{y2}$ are larger than the falling period (or rising period) of the drive voltage $V_{y1}$ and the rising period (or falling period) of the drive voltage $V_{y2}$ the deflection angle can be linearly changed for a longer period so that the optical deflector according to the presently disclosed subject matter can be applied to an image display apparatus such as a projector.

Also, according to the above-described embodiments, the resonation of the harmonic frequency components of the drive voltage $V_{y1}$ and $V_{y2}$ with the natural frequency components of the mechanically-vibrating system of the mirror 1 can be suppressed.

Further, the routines of FIGS. 7 and 11 are stored as programs in the ROM or the like of the control circuit 21.

Furthermore, when the two-dimensional optical deflector of FIG. 1 has the same inner piezoelectric actuators without the torsion bars as the outer piezoelectric actuators, the presently disclosed subject matter can also be applied to such an optical deflector.

Further, the presently disclosed subject matter can be applied to a one-dimensional optical deflector which is constructed by a mirror; a movable frame for supporting the mirror; a support body surrounding the movable frame; and piezoelectric actuators fixed between the support body and the movable frame and serving as cantilevers for rocking the mirror through the movable frame with respect to an axis of the mirror.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A driver for driving an optical deflector which comprises:
   a mirror;
   a movable frame for supporting said mirror;
   a support body surrounding said movable frame; and
   a first group of piezoelectric actuators serving as cantilevers and a second group of piezoelectric actuators serving as cantilevers alternating with said first group of piezoelectric actuators,
   wherein said piezoelectric actuators are folded at every actuator and connected from said support body to said movable frame, each of said piezoelectric actuators being in parallel with one axis of said mirror,
   wherein said driver generates a first drive voltage having first saw-tooth waves and applies said first drive voltage to said first group of piezoelectric actuators,
   wherein said driver generates a second drive voltage having second saw-tooth waves opposite in phase with said first saw-tooth waves, and applies said second drive voltage to said second group of piezoelectric actuators, and
   wherein a difference in phase between said first and second saw-tooth waves is a predetermined value to suppress resonation of harmonic frequency components of said first and second drive voltages with a natural frequency of a mechanically-vibrating system of said mirror with respect to said axis thereof depending upon said piezoelectric actuators.

2. The driver as set forth in claim 1, wherein an amplitude of a deflection angle of said mirror when only said first drive voltage is applied to said first group of piezoelectric actuators without application of said second drive voltage is made equal to an amplitude of a deflection angle of said mirror when only said second drive voltage is applied to said second group of piezoelectric actuators without application of said first drive voltage.

3. The driver as set forth in claim 1, wherein:
each of said first saw-tooth waves has a first rising period and a first falling period larger than said first rising period, and each of said second saw-tooth waves has a second rising period corresponding to said first falling period and a second falling period corresponding to said first rising period,
a start point of said second rising period of said second drive voltage is later than a start point of said first rising period of said first drive voltage,
a difference in time between a start point of said first falling period of said first drive voltage and the start point of said second rising period of said second drive voltage is a half period of said natural frequency of said mechanically-vibrating system.

4. The driver as set forth in claim 3, wherein said first saw-tooth waves and said second saw-tooth waves have a frequency of 60 Hz, and a ratio of said first rising period to said first falling period of said first drive voltage is 9:1 and a ratio of said second rising period to said second falling period of said second drive voltage is 1:9.

5. The driver as set forth in claim 3, wherein the absolute value of a phase difference between the start point of said first rising period of said first drive voltage and the start point of said second rising period of said second drive voltage is around a predetermined value excluding zero.

6. A method for setting drive data for driving an optical deflector which comprises:
a mirror;
a movable frame for supporting said mirror;
a support body surrounding said movable frame; and
a first group of piezoelectric actuators serving as cantilevers and a second group of piezoelectric actuators serving as cantilevers alternating with said first group of piezoelectric actuators, wherein said piezoelectric actuators are folded at every actuator and connected from said support body to said movable frame, each of said piezoelectric actuators being in parallel with one axis of said mirror,
said method comprising:
setting a period common to first and second drive voltages for said first and second groups of piezoelectric actuators, respectively;
designating a ratio of a rising period to a falling period, a total of said rising period and said falling period being equal to said set period to select first drive data for said first group of piezoelectric actuators forming a saw-tooth wave having said rising period and said falling period; and
inverting and shifting said first drive data to obtain second drive data for said second group of piezoelectric actuators,
wherein a shifted amount of said first drive data is a value corresponding to a half wave-length of a natural frequency of a mechanically-vibrating system of said mirror with respect to said axis thereof depending upon said piezoelectric actuators.

7. The method as set forth in claim 6, further comprising making an amplitude of a deflection angle of said mirror when only said first drive voltage of said first drive data is applied to said first group of piezoelectric actuators without application of said second drive voltage equal to an amplitude of a deflection angle of said mirror when only said second drive voltage of said second drive data is applied to said second group of piezoelectric actuators without application of said first drive voltage.

8. The method as set forth in claim 6, wherein:
said rising period of said first drive voltage and a falling period of said second drive voltage are larger than said falling period of said first drive voltage and a rising period of said second drive voltage,
a start point of said rising period of said second drive voltage is later than a start point of said rising period of said first drive voltage, and
a difference in time between a start point of said falling period of said first drive voltage and the start point of said rising period of said second drive voltage is a half period of said natural frequency of said mechanically-vibrating system of said mirror with respect to said axis thereof depending upon said piezoelectric actuators.

9. The method as set forth in claim 6, wherein:
each of first saw-tooth waves of said first drive voltage has a first rising period and a first falling period larger than said first rising period, and each of second saw-tooth waves of said second drive voltage has a second rising period corresponding to said first falling period and a second falling period corresponding to said first rising period,
a start point of said second rising period of said second drive voltage is later than a start point of said first rising period of said first drive voltage, and
a difference in time between a start point of said first falling period of said first drive voltage and the start point of said second rising period of said second drive voltage is a half period of said natural frequency of said mechanically-vibrating system.

10. The method as set forth in claim 9, further comprising determining whether or not the absolute value of a phase difference between the start point of said first rising period of said first drive voltage and the start point of said second rising period of said second drive voltage is around a predetermined value excluding zero, wherein said period setting and said ratio designating are repeated when the absolute value is not around said predetermined value.

* * * * *